(12) United States Patent
Parillo

(10) Patent No.: US 9,475,130 B2
(45) Date of Patent: Oct. 25, 2016

(54) SYSTEM AND METHOD FOR REPRODUCING CODED KEYS

(71) Applicant: Michael Parillo, North Brunswick, NJ (US)

(72) Inventor: Michael Parillo, North Brunswick, NJ (US)

( * ) Notice: Subject to any disclaimer, the term of this patent is extended or adjusted under 35 U.S.C. 154(b) by 435 days.

(21) Appl. No.: 14/175,532

(22) Filed: Feb. 7, 2014

(65) Prior Publication Data

US 2015/0224584 A1   Aug. 13, 2015

(51) Int. Cl.
| | |
|---|---|
| *B23C 3/35* | (2006.01) |
| *B21D 53/42* | (2006.01) |
| *B24B 55/04* | (2006.01) |
| *B24B 17/02* | (2006.01) |

(52) U.S. Cl.
CPC .............. *B23C 3/355* (2013.01); *B21D 53/42* (2013.01); *B24B 17/021* (2013.01); *B24B 55/04* (2013.01)

(58) Field of Classification Search
CPC ......... B23C 3/303; B23C 3/35; B23C 3/355; B24B 17/021; B21D 53/42
USPC ................................... 451/237, 238; 409/81
See application file for complete search history.

(56) References Cited

U.S. PATENT DOCUMENTS

| | | | |
|---|---|---|---|
| 1,750,217 A | 3/1930 | Falk | |
| 1,752,668 A | 4/1930 | Johnson | |
| 1,811,922 A | 6/1931 | Falk | |
| 3,130,573 A | 4/1964 | Hines | |
| 3,469,498 A | 9/1969 | Adler | |
| 4,521,142 A * | 6/1985 | Juskevic | B23C 3/35 409/81 |
| 4,780,032 A * | 10/1988 | Uyeda | B23C 3/35 409/82 |
| 5,054,350 A * | 10/1991 | Gartner | B21D 53/42 83/414 |
| 5,711,643 A * | 1/1998 | Parr | B23C 3/35 409/80 |
| 5,720,211 A * | 2/1998 | Cahan | A45C 11/325 83/452 |
| 6,588,995 B2 * | 7/2003 | Wills | B23C 3/35 269/106 |
| 7,210,986 B2 | 5/2007 | Parillo et al. | |
| 7,530,884 B2 | 5/2009 | Parillo et al. | |
| 7,918,629 B2 * | 4/2011 | Belflower | B23C 3/355 269/268 |
| 8,225,696 B2 * | 7/2012 | Downes | A45C 11/328 29/402.06 |
| 2006/0044109 A1 * | 3/2006 | Griffits | E05B 17/103 340/5.65 |
| 2008/0226408 A1 * | 9/2008 | Belflower | B23C 3/355 409/131 |
| 2015/0050094 A1 * | 2/2015 | Gerlings | E05B 19/04 409/81 |

* cited by examiner

*Primary Examiner* — Eileen Morgan

(57) ABSTRACT

Coded keys are produced by reference to a set of matrix keys, each matrix key of a set has uniform notch spacing and a uniform but different depth compared to the others. A holder carries a complete matrix key set. The holder, in turn, is securable to a carriage having a key blank-retaining vise. By manipulating the holder, any selected one of the matrix keys may be brought into fixed coplanar and linear registration with the key blank. As the holder and carriage are moved synchronously, a first matrix key is urged toward a stylus at a given code location defined by a notch of specific depth and a cutter removes material from the key blank to form a corresponding notch. The process is repetitively performed until a notch of the prescribed code depth is defined at each location along the key blank needed to form a replacement key.

20 Claims, 11 Drawing Sheets

SYSTEM AND METHOD FOR REPRODUCING CODED KEYS

BACKGROUND OF THE INVENTION

1. Field of the Invention

The present invention relates generally to key origination and duplication and, more particularly, to the field of forming a key from a key blank even when the original or pattern key to be duplicated is lost or otherwise unavailable.

2. Discussion of the Background Art

The need to fabricate duplicate keys undoubtedly dates back to the earliest implementation of the lock, the earliest methods of making duplicate keys being the exclusive province of skilled artisans who used files and other hand tools to slowly shape a small section of metal into the desired key form. The electric motor, of course, made it possible to mechanize the process of forming and shaping duplicate keys, and a key of moderate complexity can typically be duplicated-by a relatively unskilled worker in a matter of minutes. Since its introduction and subsequent widespread commercial acceptance, however, the mechanized key duplication process has changed very little over the years.

Conventional key duplication systems operate on one of three general principles. Systems of the first type utilize a tracing principle wherein a specimen key with the essential pattern profile (i.e., a "pattern" key) is placed into a first vise clamp. A key blank to be contoured with the essential pattern is placed into a juxtaposed second vise clamp. The pattern key is brought into contact with a guiding stylus, while the key blank is brought into contact with a cutting wheel. A carriage associated with the vise clamps is then shifted laterally and angularly reoriented inwardly and outwardly, such that the engagement of the pattern key with the stylus imparts a corresponding pivotal movement of the carriage and the cutting wheel removes material from the working edge surface of the key blank to form a contoured profile matching that of the pattern key. When this process has concluded, the key blank is removed from the vise clamps, and any burrs or other imperfections formed during the cutting operation are removed with a file or a buffing wheel. Early machine configurations of the pattern key tracing type are exemplified by U.S. Pat. No. 1,752,668 entitled "Key Duplicator" issued to Johnson on Apr. 1, 1930. More recently, the inventors herein disclosed, in U.S. Pat. No. 7,530,884 entitled "System and Method for Duplicating Keys", an improved key duplicating machine which utilizes a profiled cutter having an abrasive surface. This abrasive cutter is driven at a much higher rate of speed (e.g., 30,000 rpm) than the slower turning, toothed cutting wheels that had previously characterized the prior art. This configuration resolved a number of deficiencies in the prior art, including the tendency of the key blank to shift or jump out of the clamping vice under the action of the slow rotating cutting teeth.

In conventional key duplication systems of the second type, height wise adjustment and spacing of the cuts along the working edge of the key blank are effected by indexing means which position the cutter and key blank in accordance with a code, so that if the code of the specimen key to be duplicated is known, the key may be duplicated without the actual presence of the pattern key. Apparatus configurations of the code key cutting type are exemplified by U.S. Pat. No. 1,750,218 entitled "Key Cutting Machine" and issued to Falk on Mar. 11, 1930, U.S. Pat. No. 1,811,922 by the same title and issued to Falk (on Jun. 30, 1911), and U.S. Pat. No. 3,469,498 entitled "Code Key Cutter Device" issued to Adler et al on Sep. 30, 1969. The Falk machines used sets of detachable and removable discs to regulate the spacing and depth of the notches to be cut along the working edge of the key blank. Each disc had a series of holes that were numbered to match the lock manufacturer's specifications. Space and depth keys were provided to set the spacing and depth of cut prior to originating keys. Over the years, more than 150 sets of discs were made for a now-discontinued machine known as the Universal Code Machine. More recently, computer controlled cutting machines that use complex electronic control systems, an onboard database of codes specifying notch spacing and depth have been introduced. Examples of this more recent type include the one disclosed in U.S. Pat. No. 5,711,643 issued on Jan. 27, 1998 to Parr et al.

A third type of key duplication system, a variation of the code key cutting type, utilizes a "key nipping tool" to remove material from along the working edge of the key blank. The user is guided by an index card that has predetermined code depth and spacing information. A system of this type is disclosed in U.S. Pat. No. 5,054,350 entitled "Key Punch Machine" and issued to Gartner et al. on Oct. 8, 1991.

One of the benefits of the abrasive-cutter based system disclosed in U.S. Pat. No. 7,530,884 is that it is easy and economical to manufacture, maintain and operate. The '884 system, sold by Roto-Smith Tools LLC of North Brunswick, N.J., is not limited to duplication of pattern keys. It has also been used for reproducing a key of which only the code number is known. In this case, individual depth-and-spacing or "matrix" keys have been used, one at a time, in place of the original key to be traced. Each matrix key comprises notches spaced apart from one another by a distance equal to the spacing between the notches of the key to be produced, all these notches having the same depth in a given matrix key and one matrix key existing for each figure of the code, i.e. for each possible depth for a notch. A first matrix key corresponding to the first figure of the code is fixed in front of the stylus and the stylus is engaged in the first notch of the matrix key so as to cut the first notch in the blank. The first matrix key is then replaced by a second matrix key corresponding to the second figure of the code and the stylus is engaged in the second notch of the second matrix key so as to cut a second notch in the blank. This operation is continued successively for all the figures of the code.

The aforementioned process of using the '884 system is far from optimal. After each notch has been cut, the next matrix key must be repositioned in the clamping vise to account for the next notch depth. This repositioning process is time consuming, complicated and a potential source of error. Furthermore, a determined notch of the matrix, and only this notch, must be scanned by the stylus. This operation is delicate; if the carriage slips relative to the stylus, the cutter forms a notch of incorrect shape and the blank being cut must be scrapped. This latter drawback may be overcome by providing one matrix per depth and per possible location of notch, but, in that case, the number of matrices is considerably increased. Great skill and precision on the part of the operator is demanded.

A continuing need therefore exists for a code key machining system which is simple and economical to manufacture, easy to operate and maintain, and which does not introduce so much error into the process that the keys produced will not perform their intended function.

A further need exists for a key machining system which can be optionally adapted to make use of an original key when the same is available.

SUMMARY OF THE INVENTION

The aforementioned needs are addressed, and an advance is made in the art, by a system in which coded keys are produced by reference to a set of matrix keys. All of the matrix keys within a set have a uniform spacing between the notches formed thereon, in accordance with the pin and tumbler spacing specified by a lock manufacturer. However, each respective one of the matrix keys has notches of a uniform but different depth from all of the other matrix keys of that set.

The system includes a base, a rotary cutter driven by the shaft of a high speed motor and supported by the base, and a stylus supported by the base in axial alignment with the cutter. The system further includes a carriage movable relative to the base and having a blank key retaining vise secured thereto, the carriage being manipulable so as to bring the key blank into engagement with the cutter. In one embodiment, the rotary cutter is a profiled abrasive cutter driven at a shaft rotation speed of 30,000.

A first holder carries a complete set of matrix keys according to the notch spacing and depth specifications of a first lock manufacturer. The first holder, in turn, is secured to a carriage having a key blank-retaining vise. By appropriate manipulation of the first holder, any selected one of the matrix keys carried by it may be brought into fixed coplanar and linear registration with the key blank. The first holder and carriage are then moved synchronously, and as a first matrix key is urged toward the stylus within an indexing zone corresponding to a notch of a specific key code depth, a corresponding notch of that depth is formed by the cutter on the key blank. The process is repetitively performed until a notch of the prescribed code depth is defined at each indexing zone location along the key blank, thereby forming a replacement key conforming to the specified code.

When it is desired to machine a code key conforming to the specifications of a second manufacturer whose notch spacing and depth convention does not match that of the first, the first holder is exchanged for a second holder carrying a second set of matrix keys. To this end, each holder has a modular design adapted for quick removal and re-attachment to the carriage.

In one embodiment, each holder includes an annular turret defining peripheral slots for retaining the matrix keys in fixed relation relative to one another. Each groove is sufficiently deep and long as to receive and retain a corresponding matrix key, while exposing enough of the working edge as to allow the stylus to traverse the entire depth of a grove at each lock pin position. The manner in which each matrix key is retained in its respective groove is subject to variation. For example, an adhesive bond, mechanical friction-fit, weld, or any combination of these bonding techniques may be employed. As an alternative example, the matrix keys may be retained by a series of respective mechanical clamps disposed at equiangular locations along the periphery of the turret. It suffices to say that the matrix keys may be fixed to the holder, as exemplified by the aforementioned bonding techniques, or they may be removably mounted relative to the holder, as exemplified by the aforementioned mechanical clamping, A biasing spring and bolt arrangement urges the selected holder into registration with the carriage. To maintain a precise alignment between the selected matrix key and key blank, a detent mechanism comprising an axial projection on the carriage and a series of angularly spaced holes defined in the annular turret may be provided wherein alignment of the projection with each respective hole aligns precisely one of the matrix keys with a key blank held by the vise. Provisions can be made to incorporate a clamp along the periphery of the annular turret to accommodate an original key when one is available. Alternatively, the holder can be replaced with a detachable vise module dimensioned and arranged for registration with the above described detent mechanism and for holding an original key in the aforementioned coplanar and axial alignment relative to the key blank.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The aspects of the present invention will become more apparent by describing in detail illustrative, non-limiting embodiments thereof with reference to the accompanying drawings, in which like reference numerals refer to like elements in the drawings.

DETAILED DESCRIPTION

Figure 1:
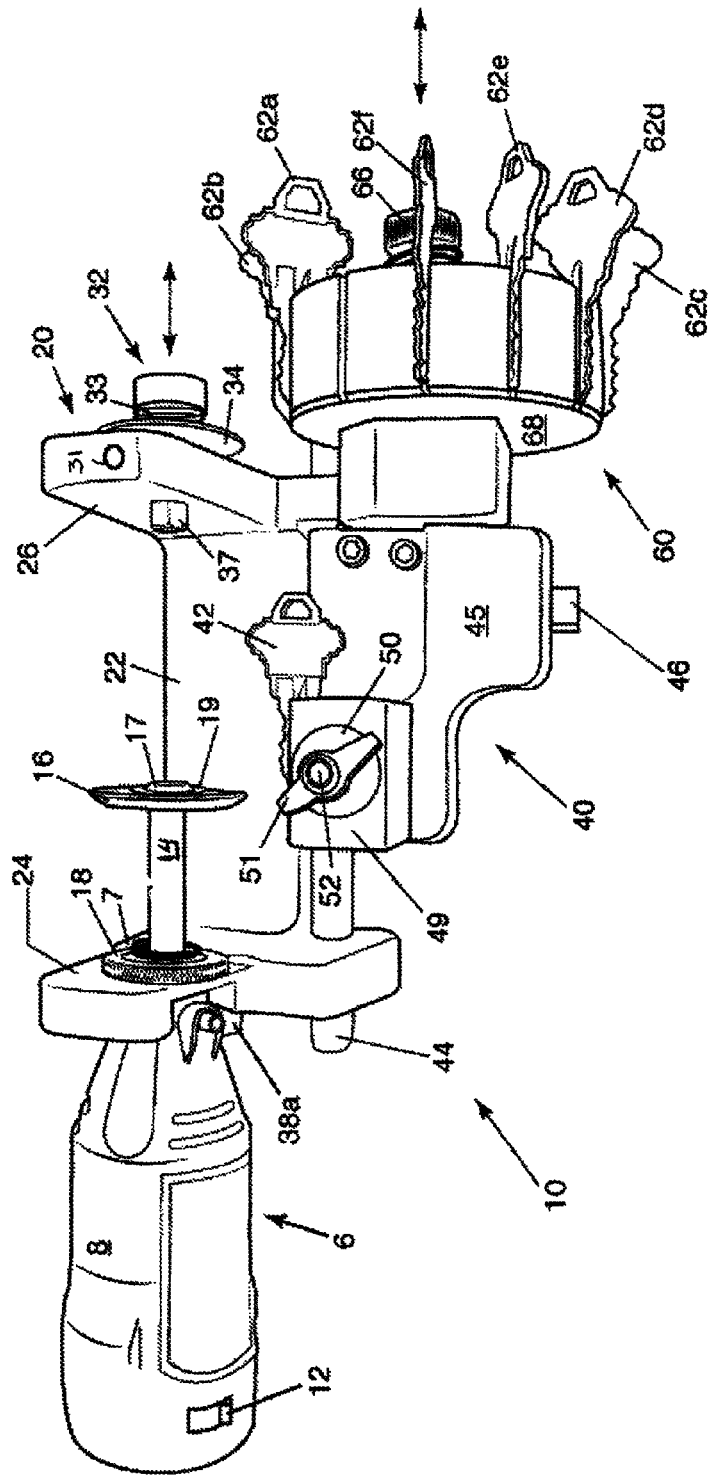
FIG. 1 is a front perspective view depicting a code key reproducing apparatus constructed in accordance with an illustrative embodiment of the present invention.

With initial reference to FIG. 1, there is shown a code key reproducing system 10 constructed in accordance with an illustrative embodiment of the present invention. As seen in FIG. 1, system 10 includes a stationary base indicated generally at reference numeral 20, a carriage assembly indicated generally at reference numeral 40, and a matrix key holder indicated generally at reference numeral 60. Together, base 20, carriage assembly 40, and holder 60 comprise a code key reproducing system attachment, as will be explained in greater detail shortly, for use in combination with an abrasive cutting element rotated at high speed. In exemplary embodiments of the invention, the cutting element is driven by a high speed motor of the type found in a conventional, high-speed rotary tool, the tool being attached in the same manner as that described in U.S. Pat. No. 7,530,844 which patent is expressly incorporated herein by reference in its entirety. It should, however, be emphasized that although a high speed abrasive cutting arrangement is preferred, a fixed mounted motor and cutter may also be utilized without departing from the spirit and scope of the present invention. The use of an abrasive cutter is preferred because only a small amount of material is removed with each rotation so that the jarring and vibrations associated with slower moving, "toothed" milling cutters is substantially avoided. Moreover, where the cutting teeth of the milling cutters would be quickly worn down by the harder alloys used in the manufacture of modern keys, an abrasive, profiled cutter is characterized by long hours of reliable and accurate operation. In any event, and with continued reference to FIG. 1, it will be appreciated and understood by those skilled in the art that commercially available rotary tools are generally equipped with both an on/off switch and a speed selector switch—the latter enabling the user to select a rotation speed of between, say, 8,000 and 36,000 rpm, and also a rotating, tool retaining chuck driven by the motor shaft. Insofar as the specific key cutting application contemplated herein does not require speed adjustment, substantial cost savings can be realized by foregoing the speed selector switch. In this regard, a fixed rotation speed of 30,000 rpm has been found to be more than adequate for the purposes of the various embodiments of the present invention.

An illustrative rotary tool optimally adapted to use in accordance with the present invention is indicated generally at reference numeral 6 in FIG. 1, and includes an elongated dielectric housing 8 having a threaded tip 7 (FIG. 2), an on/off switch 12 and, in place of a rotating chuck, an elongated central shaft 14. In the embodiment depicted in FIG. 1, central shaft 14 is dimensioned and arranged so as to extend approximately 3 to 4 cm from tip 7. To the distal end of central shaft 14, a profiled, abrasive cutting element indicated generally at reference numeral 16 is affixed by a threaded fastener and washer indicated at reference numeral 17 and 19, respectively. An annular collet 18, having interior threads complementary to those of dielectric housing tip 7, secures rotary tool 6 to base 20.

Figure 2:
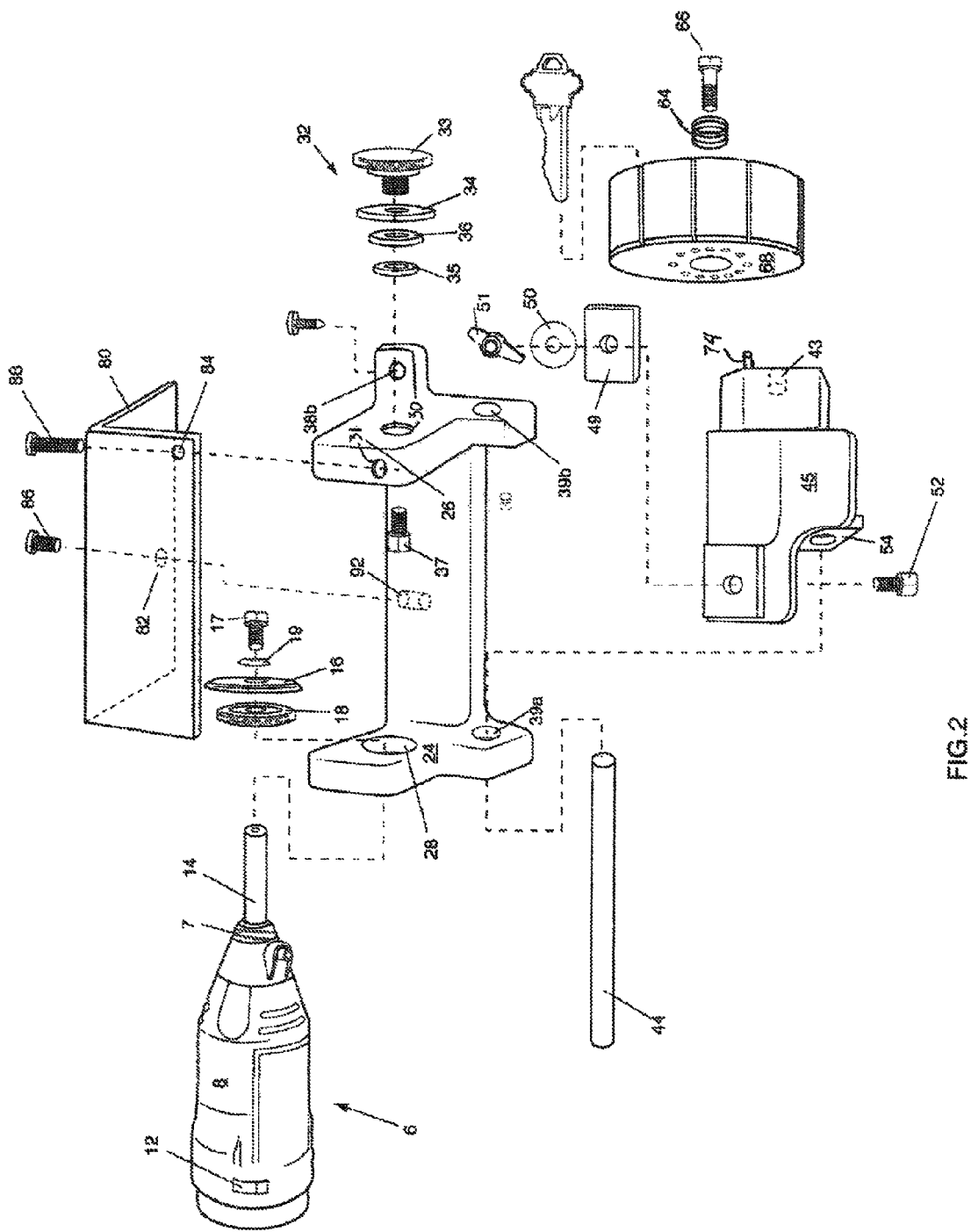
FIG. 2 is perspective view of the illustrative apparatus of FIG. 1, broken apart to better illustrate the constituent components thereof and assist in understanding how the exemplary apparatus is assembled.

With reference now to both FIGS. 1 and 2, it will be seen that base 20 includes a transverse section 22 which extends between and interconnects a pair of aligned upright sections indicated generally at 24 and 26. Each of sections 24 and 26 define an axial bore indicated at reference numerals 28 and 30, respectively (FIG. 2). Axial bores 28 and 30 are coaxial, with bore 28 being dimensioned and arranged to receive a region of dielectric housing 8 proximate threaded tip 7. Upon insertion of the aforementioned portion of dielectric housing 8 into axial bore 26, annular collet 18 is slid over shaft 12 and tightened onto the threads of tip 7 to thereby secure tool 6 to base 20 in the manner shown in FIG. 1. Thereafter, profiled cutting element 16 is mounted to the distal end of shaft 12 using screw 17 and washer 19.

A stylus assembly 32 includes an adjustment knob 33, a profiled stylus element 34 defining a circumferential profile portion dimensioned and arranged to engaging the surface of a matrix key portion to be traced and to match a peripheral surface portion of cutting element 16, a spacer 36, a washer 37 and an axially adjustable hex nut indicated generally at 37. The threaded distal portion of hex nut 37 is inserted through a correspondingly threaded aperture extending through the distal end of knob 33. A desired axial spacing between cutting element 16 and stylus 34 is achieved by moving the axial hex head portion of hex nut 37 within aperture 30. The stylus is then locked by tightening screw 88 within bore 31 (FIG. 2) against hex nut 37.

The aforementioned axial adjustment of stylus 34, relative to the abrasive cutting surface of cutting element 16, achieves a precise spacing between target surfaces of a key blank 42 and a selected matrix key retained by holder 60, as matrix key 62a. In the latter regard, it will be seen in FIG. 1 that matrix key 62a is shown in a position of axial and coplanar alignment with key blank 42. In the illustrative examples of FIGS. 1-2 and 3A-3E, each matrix key is part of a set of matrix keys (of which only six—indicated generally at 62a-62f—are shown carried by holder 60 in FIG. 1). Throughout the various embodiments, each respective matrix key as matrix key 62a is adhesively bonded or otherwise affixed within a corresponding slot 63 defined in the peripheral surface of a cylindrical holder member 68.

Base 20 further includes a pair of mounting holes indicated generally at 38a and 38b for securing base 20 to a fixed support surface. Finally, a pair of coaxial bearing supports indicated generally at 39a and 39b (FIG. 2) are defined in base 20, the purpose of these being to support the indexing (axial and angular) shaft 44 to which carriage 40 is mounted.

Matrix keys, also known as space-and-depth keys in the locksmithing trade, have heretofore been used mainly to cut keys for home and car entry locks using the bitting number without the use of a code machine. Even where the code is not known, a skilled locksmith can take a lock apart, so that just the plug with pins in it can be further examined. In many cases, the locksmith will remove and measure each pin separately to derive the code of the lock. In a basic six-pin lock set, the locksmith opens up the shafts in the cylinder and empties them out, obtaining six springs and 12 tiny pins. All of the upper pins are exactly the same size. The remaining six pins (the lower pins) will be of various lengths to match up with the notches on the key. The dimensions of the lower pins are such that when the properly coded key is inserted, the lower pins will push all the upper pins just above the shear line, allowing the cylinder to turn freely. (This process may vary depending on the particular design of the lock.) If a set of space and depth keys applicable to the make and model of a lock is available, however, the locksmith may employ a different approach. Here, the depth keys are inserted one at a time until the locksmith identifies which one renders the pin corresponding to the first notch position causes the upper pin to be flush with the shear line. The depth key which produces this alignment is recorded, and the process is repeated in order for the remaining pin positions. Many locks made by Schlage Lock Company of Colorado Springs, Colo., for example, have six tumbler pins. The number and spacing of notches on a key made to fit such a lock must match the number and location of the tumbler pins. In this example, there are ten possible depths at each of six discrete locations, and these are identified by corresponding code digits 0-9.

A matrix key for depth 0 would thus have the code 000000, the matrix key for depth 1 would have the code 111111 and so on up to matrix key 999999. If one were to use the system disclosed by the inventors herein in U.S. Pat. No. 7,530,884, the disclosure of which is expressly incorporated herein in its entirety, a key having the code 103396 would be cut by first inserting matrix key 111111 into the specimen retaining vise, and the carriage assembly would indexed axially and angularly toward the key blank within a zone confined to the first notch location. After cutting this first notch, matrix key 111111 would be removed and matrix key 000000 would be inserted in its place and the next notch would be cut. The process would be repeated until all six (in this example) positions were cut at the proper depth.

Figure 3A:
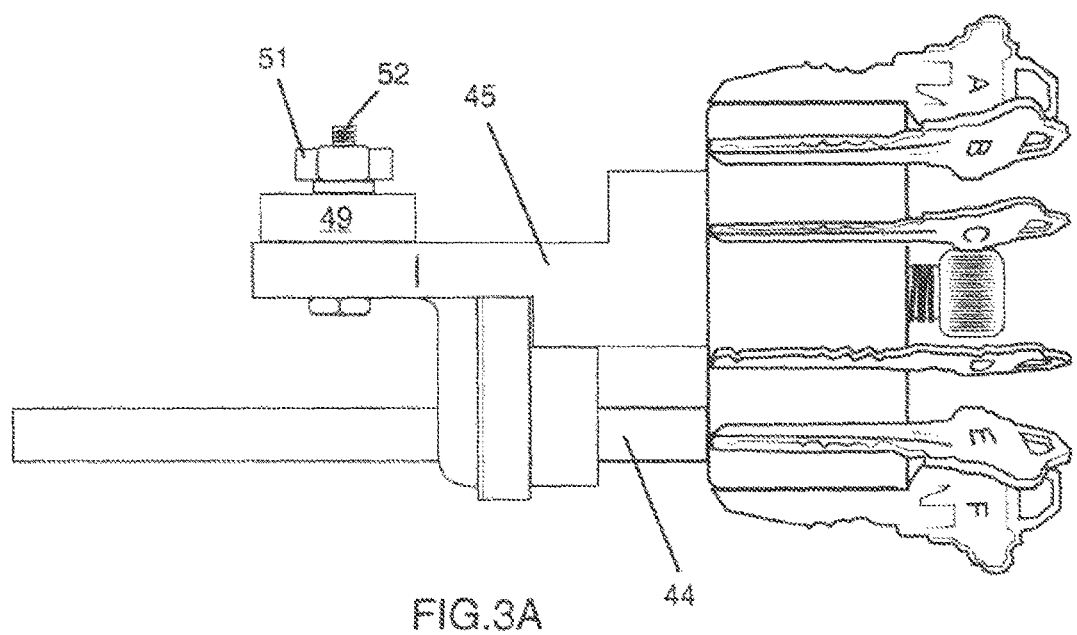
FIG. 3A is an elevation view of the carriage and holder assembly employed in the illustrative embodiment of FIGS. 1 and 2.
Figure 3B:
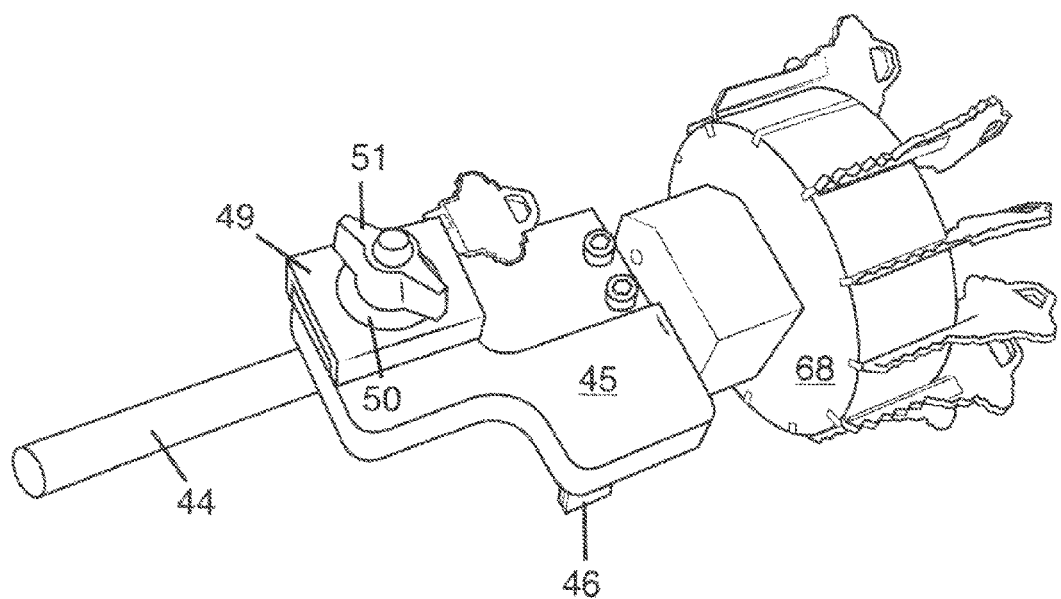
FIG. 3B is a perspective view of the carriage and holder assembly of FIG. 3A.
Figure 3C:
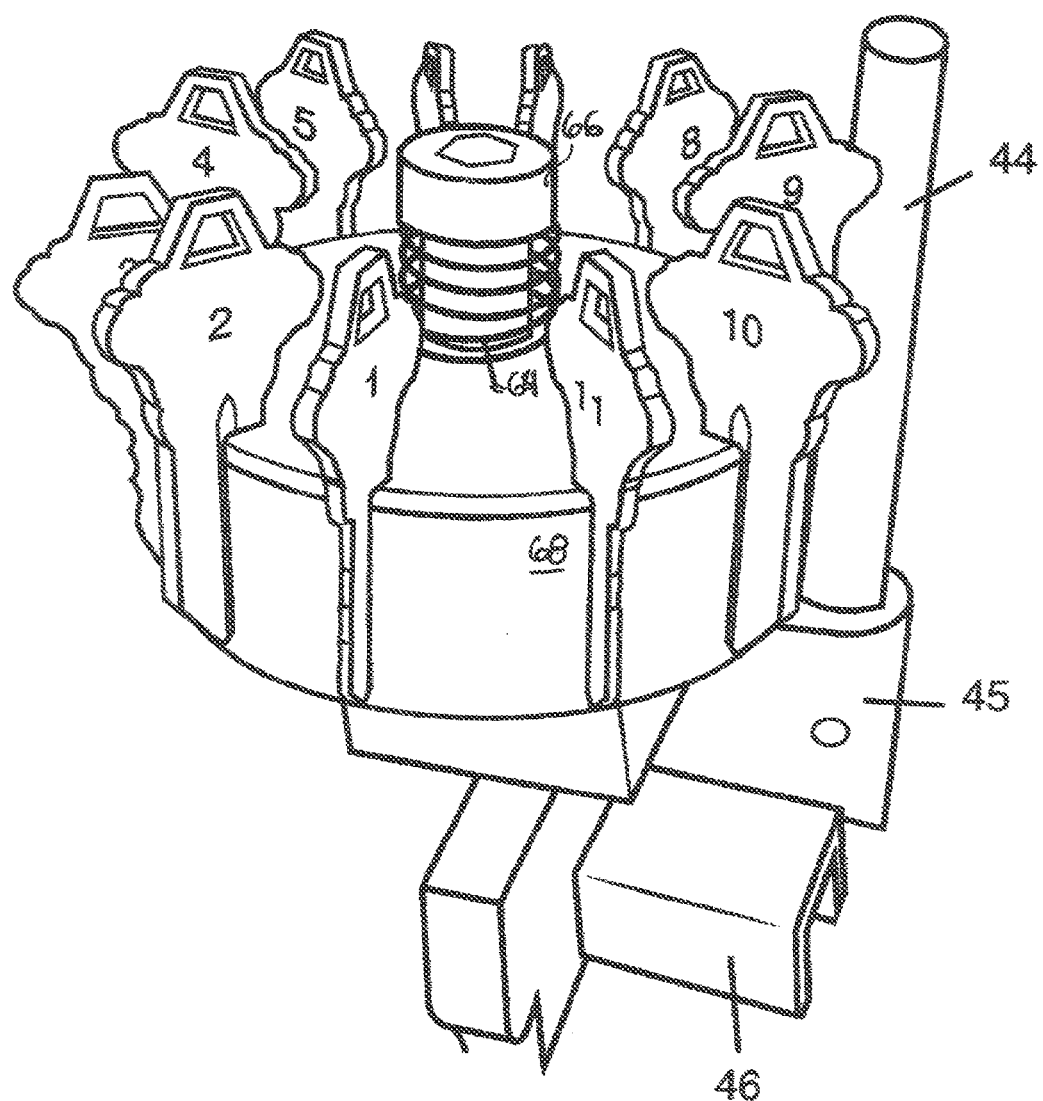
FIG. 3C is a partial, lateral perspective view of the carriage and holder assembly of FIG. 3B depicting the manner in which the matrix keys are retained by the holder shown in FIGS. 1-3B.
Figure 3D:
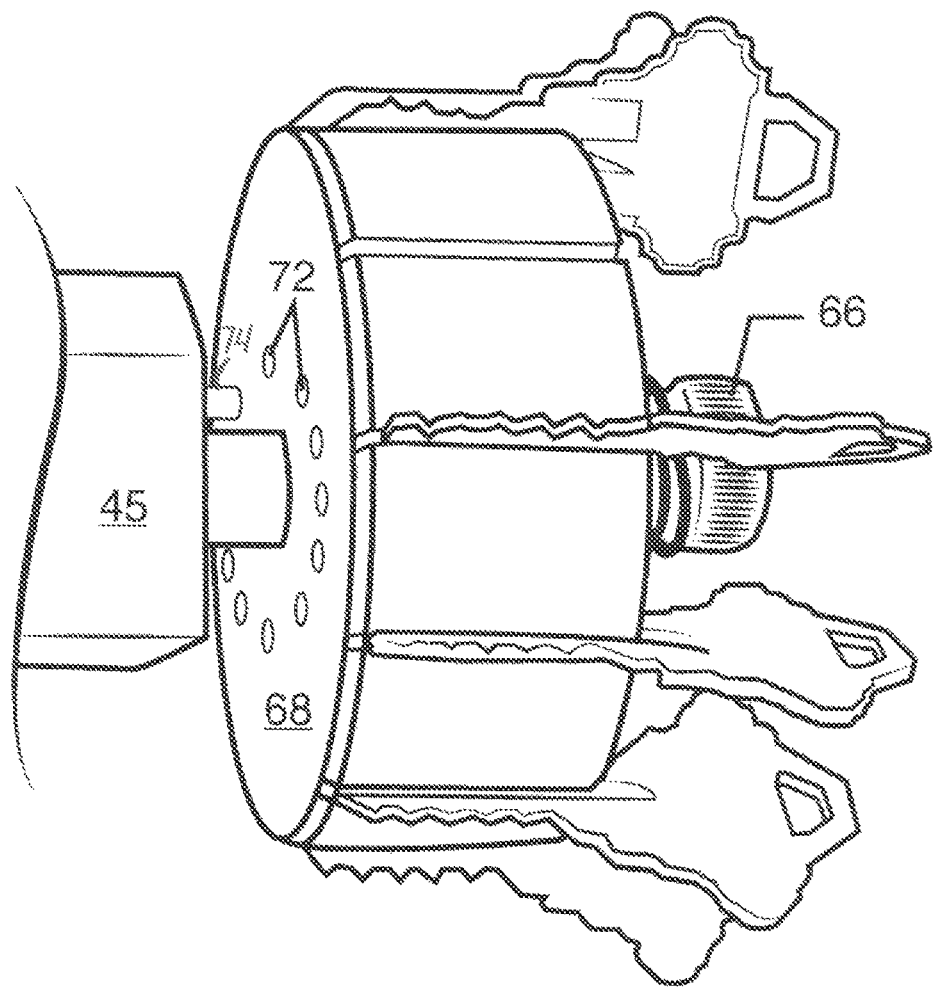
FIG. 3D is a partial elevation view of the carriage and holder assembly shown in FIGS. 1-3C, depicting an exemplary arrangement for retaining the holder and any selected matrix key in requisite alignment relative to a key blank clamped to the carriage.

In the present invention, the tedious steps of removing and replacing matrix keys during a key reproducing process, is avoided. Specifically, and with continuing reference to FIG. 1 and FIGS. 3A-3E, it will be seen that holder 60 is coupled to carriage 40 and that both are moveable as a unitary assembly relative to base 20. To this end, carriage 40 includes a carriage block indicated generally at reference numeral 45, a stand 46 for supporting the carriage at fixed orientation while at rest, and a vise 48 for retaining key blank 42. In the illustrative embodiment of FIGS. 1 and 2, vise 48 includes a clamping block 49, a washer 50, a threaded bolt 52 and a wing nut 51. With particular reference to FIG. 2-3B, it will be seen that carriage block 45 defines an axial bore 54 dimensioned and arranged to receive journal shaft 44. A set screw 55 (FIG. 5) fixes the location of carriage block 45 along journal shaft 44, and also enables the separation of the latter (to accommodate, for example, the replacement of carriage 40 and holder 60, with a two clamp vise exemplified by FIG. 6. FIG. 3A is a front elevation view depicting the position of carriage block 45 along shaft 44, while FIG. 3B exemplifies the coplanar juxtaposition of a key blank held between carriage block 45 and clamping block 49 and a matrix key held by holder 60. FIG. 3B also depicts a support element, indicated generally at reference numeral 46. Support element keeps carriage block 35 at an elevated location relative to an underlying mounting surface (not shown) during, for example, those periods when the system 10 is not in use.

As will be readily apparent to those skilled in the art, the arrangement of FIGS. 1 and 2 accommodates both linear and angular translation of carriage 40 relative to stationary base 20. This indexing translation of carriage 40 brings key blank 42 into engagement with the profiled abrasive surface of rotary cutter 16. By reference to FIG. 3C, it will be seen that that holder 60 is removably secured to carriage block 45 of carriage 40. Specifically, thumbscrew 66 is dimensioned and arranged for threaded engagement with a threaded bore 43 defined in carriage block 45. A biasing spring indicated generally at reference numeral 64 is positioned within between cylindrical holder member 68 of holder 60 and thumbscrew 6. Spring 64 serves to urge cylindrical holder member 68 against carriage block 45 in the manner shown in FIGS. 1-3B, to thereby enable to aforementioned movement as a unitary assembly.

Figure 3E:
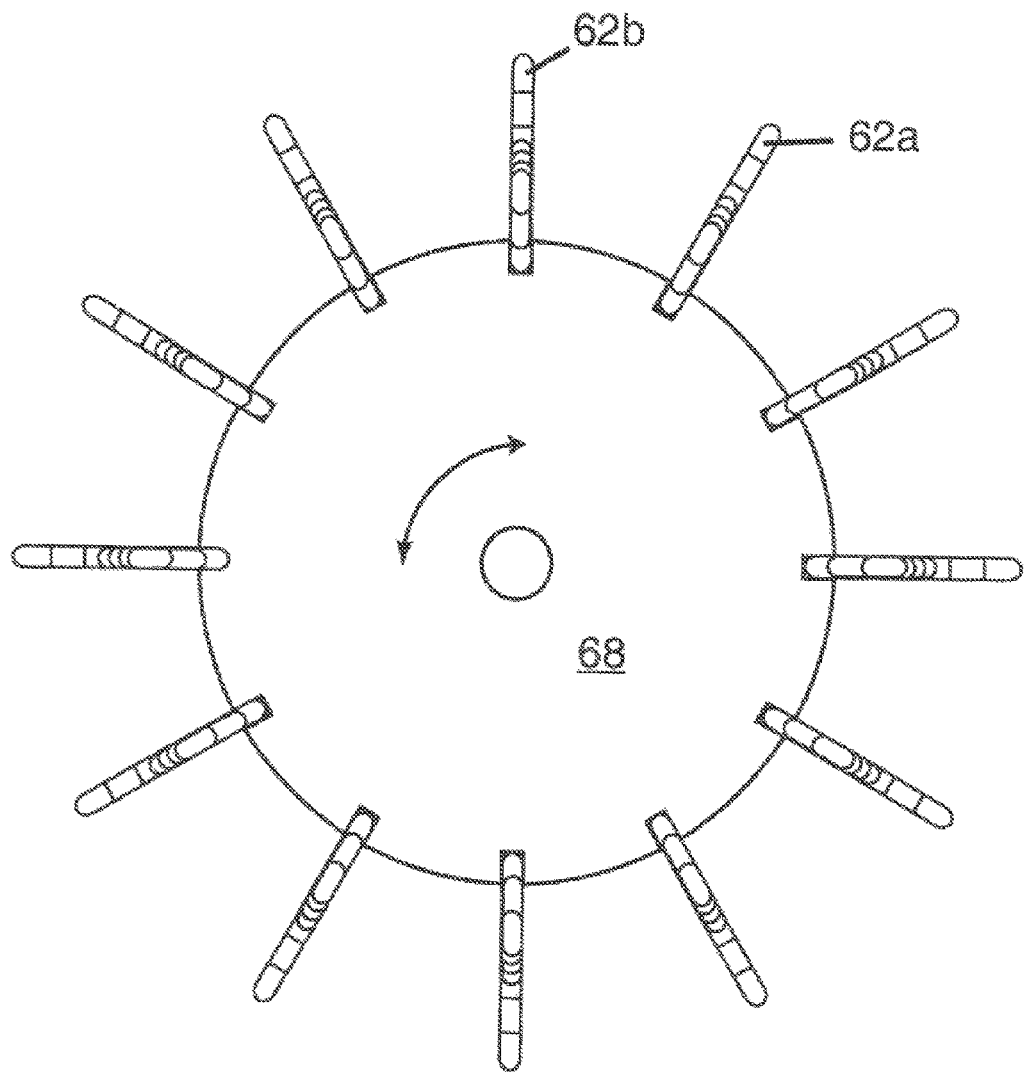
FIG. 3E is a lateral elevation view of the carriage and holder assembly shown in FIGS. 1-3D, depicting the angular movement of the holder assembly relative to the carriage and the peripheral arrangement of retained matrix keys thereon.
Figure 5:
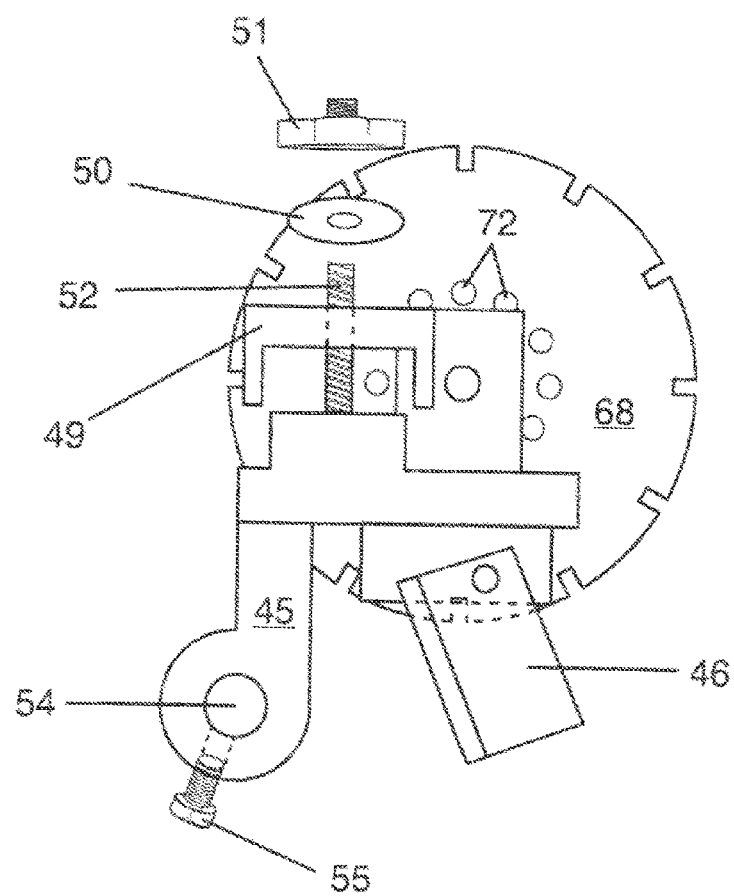
FIG. 5 is a lateral elevation view of the exemplary carriage and holder assembly shown in FIGS. 3A-3E.

After a first notch has been cut in a key blank as key blank 42 in FIG. 1 by reference to a first matrix key as matrix key 62a, a second notch having a different depth can be cut by reference to a different matrix key retained by holder 60. By reference to FIG. 3D, it will be seen that a proximal flat surface of cylindrical holder member 68 has defined therein a pattern of holes indicated generally at reference numeral 72 and radially arranged at equidistant locations from the axial bore through which bolt 66 extends. Each respective one of holes 72 is aligned with a corresponding one of the matrix key receiving slots. As such, when holder member 68 is pulled with sufficient force to overcome the urging of biasing spring 64, the pin 74 which extends axially from the opposing surface of carriage block 45 is removed from within the hole corresponding to the matrix key previously in registration with key blank 42. Holder member 68 can now be rotated in the direction of the arrows shown in FIG. 3D so as to bring a different hole 72 into registration with pin 74. With reference to FIGS. 1 and 3E, for example, rotation of cylindrical member 68 in a clockwise direction will bring the immediately adjacent hole 72 into alignment with pin 74. This new alignment, in turn, will align matrix key 62b with matrix key 42. Energization of the motor, rotation of the cutting element 16, and movement of the matrix key against the stylus in the region of the next notch to be cut will produce of a notch of the correct depth. By appropriate manipulation of cylindrical holder member 68, a series of notches can be cut by reference to those matrix keys needed to obtain the desired code. FIG. 5 depicts the various components of the assembled carriage 40 and holder 60, with the matrix keys omitted from cylindrical holder member 68 for clarity.

Figure 4A:
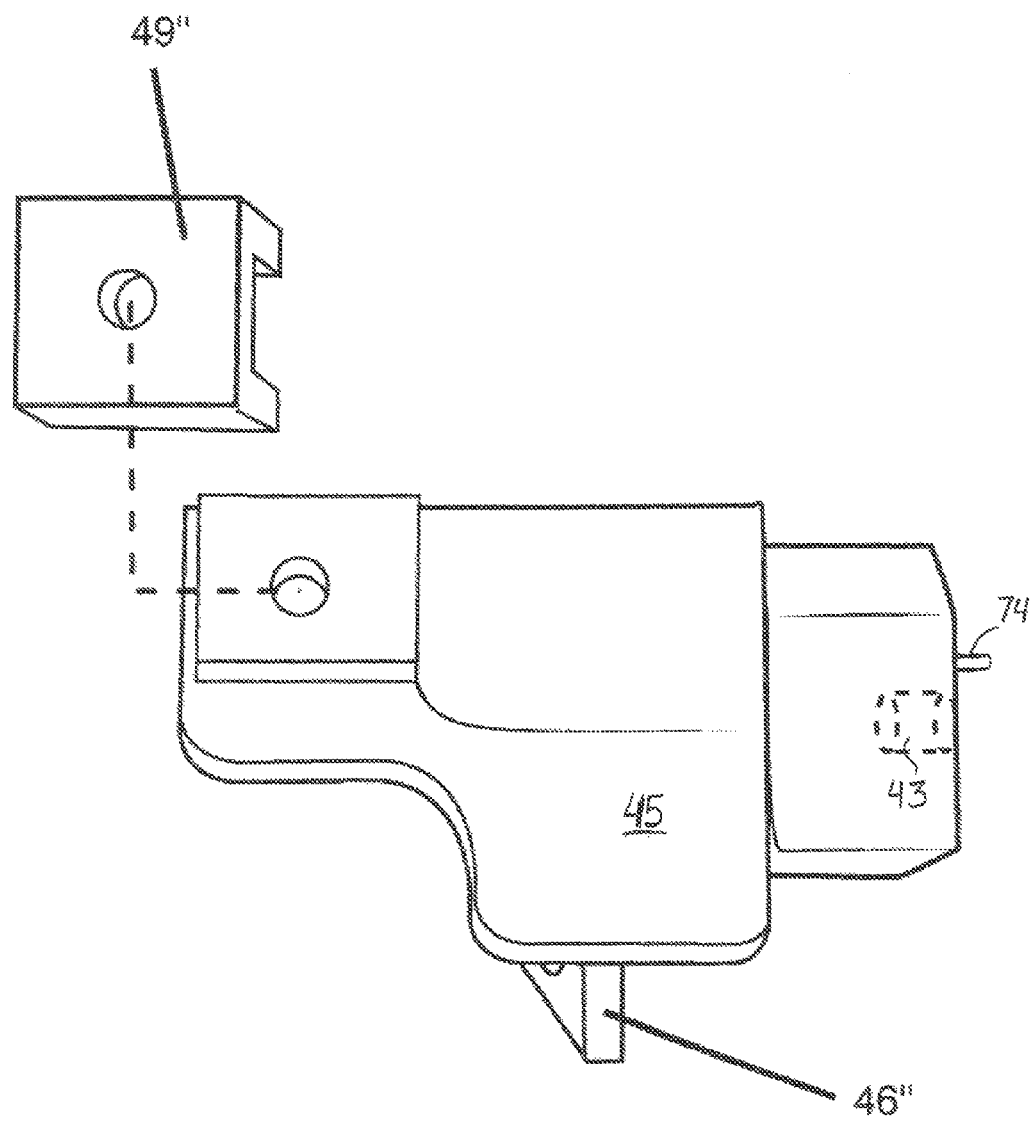
FIG. 4A is a partial perspective view of the blank key retaining portion of the carriage and holder assembly depicted in FIGS. 1-3B.
Figure 4B:
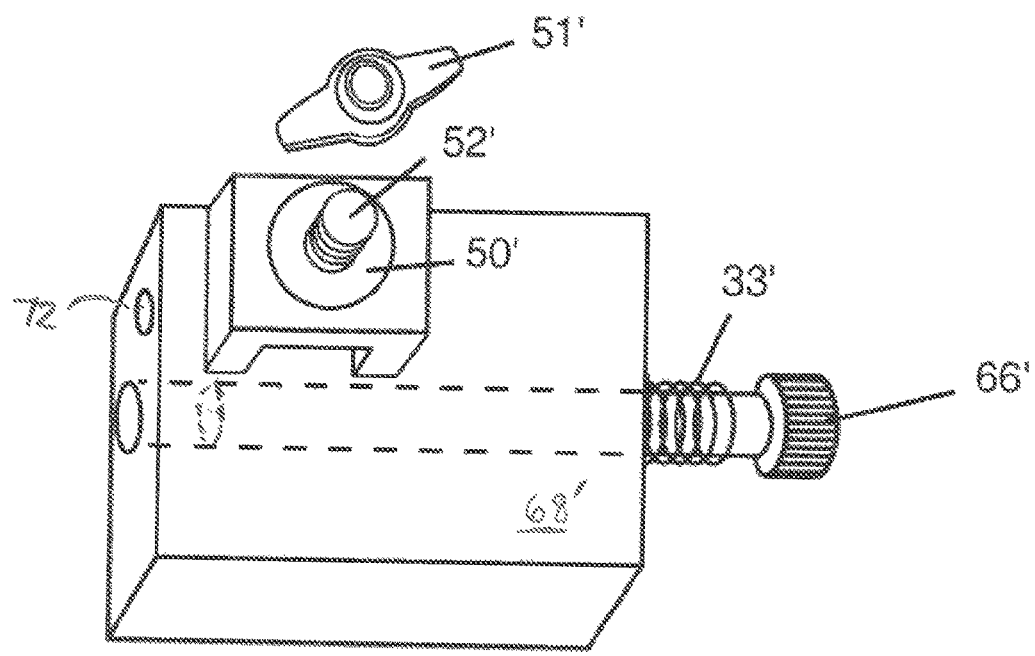
FIG. 4B is a partial perspective view of a specimen key retaining module for use with the blank key retaining module, which can be substituted for the holder structure shown in FIGS. 3A-3E when an original pattern key is available for duplication.

FIG. 4A is a perspective view of carriage block 45, including the threaded bore 43 and pin 74, but with the cylindrical member 68, bolt 66, and spring 64 removed. When an original key is available to be copied and resort to the use of matrix keys is not necessary, several options are available to the operator of system 10 in accordance with the teachings of the present invention. With reference to FIG. 4B, for example, it will be appreciated by those skilled in the art that a specimen key retaining module 68'—comprising a clamping block (not shown), washer 50', retaining nut 51' and bolt 52'—can be used in place of cylindrical holder 68 of FIG. 4A. By incorporating an alignment hole 72 dimensioned and arranged to register with projection 74 when a specimen key is retained by the clamping block of module 68' (in the same manner as key blank 42 is retained by clamp block 49 of carriage 45), the specimen key and key blank can be held in the desired relationship.

Figure 6:
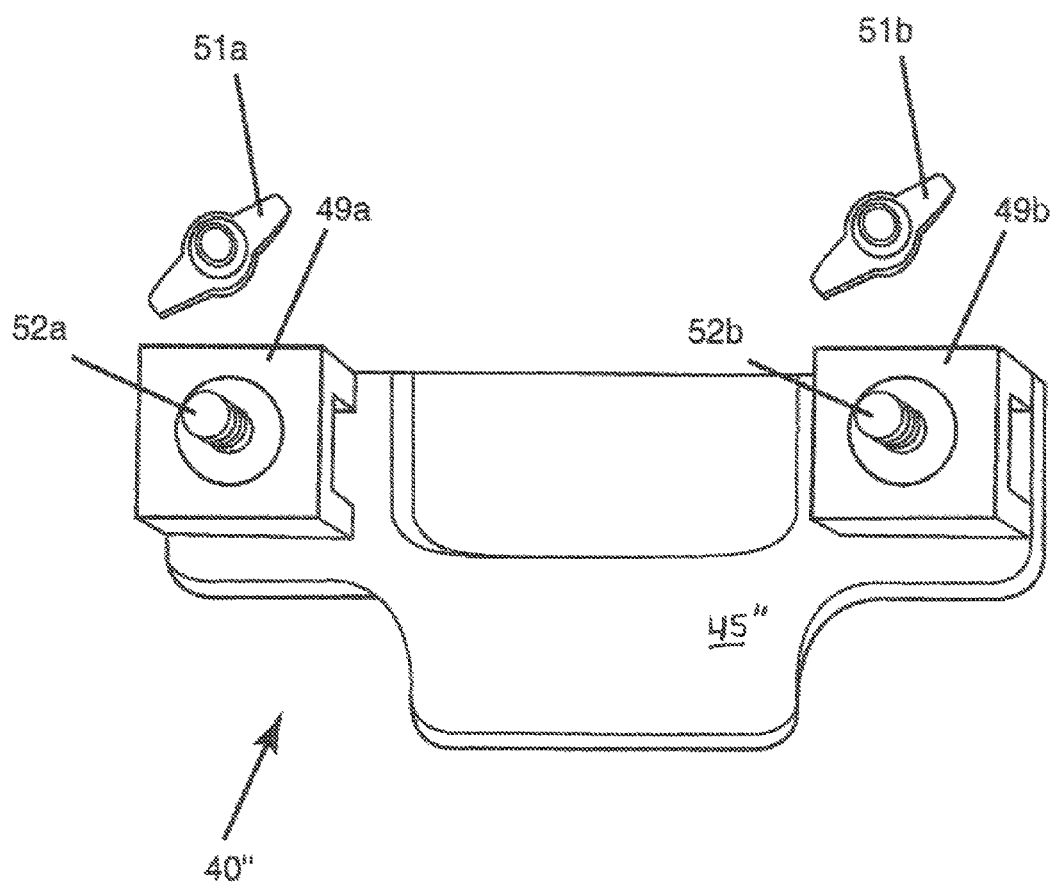
FIG. 6 is a front perspective view of a carriage assembly which may be substituted for the carriage and holder assembly shown in FIGS. 1A-3E when an original pattern key is available for duplication.

An alternate configuration for aligning a specimen key with a key blank utilizes the carriage assembly described in U.S. Pat. No. 7,530,844 and is shown in FIG. 6. Specifically, the carriage and holder assembly shown in FIGS. 1-3E and 5 can be removed in its entirety by loosening set screw 55 and sliding shaft 44 from within the bore defined within carriage block 45. Once removal of carriage block 45 has been achieved, carriage assembly 45" of FIG. 6 is lined up with bores 39a and 39b (FIG. 2), shaft 44 is reinserted, and operation proceeds as described in the aforementioned patent.

Although not shown, yet another configuration for accommodating the duplication of original specimen keys when available would be to modify cylindrical holder member 68 so as to define an integral clamp configured to retain a specimen key in place of one of the matrix key slots depicted in the various views. Such a design could easily be achieved, for example, by defining a channel with a central bore, and a removable element affixed by a bolt and nut to hold a specimen key when required.

Returning now to FIG. 2, it will be appreciated that the journals 39a and 39b within guide bearing supports 24 and 26 of housing 20 allow for the swinging upwardly and downwardly of carriage 40 and holder 60 relative to base assembly 20. As such, profiled abrasive grinding element 16 and profiled stylus 34 may be brought into and out of engagement with corresponding surfaces of key blank 42 and any selected matrix key. Operation of the system 10 proceeds after the appropriate power rotary tool as tool 6 is attached to retaining arm 24. In that regard, the rotary tool may be powered by 120 or 220 V A/C single phase household line current, by a battery source, or even by pneumatic means (e.g., compressed air). Securing nut 18 is turned clockwise to secure rotary tool 6 to carriage assembly 20. Shaft 14 preferably extends at least 4 cm outside the exterior of dielectric housing 8. Screw 17 maintains the cutter in fixed registration with shaft 14.

In a first mode of operation, an original or specimen key is positioned within a vise clamp 49b of clamp assembly 40" (FIG. 6) and key blank 42 is positioned within vise clamp 49a of clamp assembly 40". The vise clamps are tightened by rotating respective wing nuts 51a and 451b. To align a specimen key and key blank, stylus assembly 32 is moved so that the stylus 34 engages an extension on the key called the key shoulder and/or the tip end of the key—at the same location as where the cutting element touches the key blank. Set screw 88 is tightened to lock the stylus assembly 32 into position.

In a second mode of operation, clamp assembly 40" is removed and replaced with the clamp and holder assembly depicted in FIGS. 1-3E and 5. A key blank 42 is positioned below clamp block 49 and nut 51 is tightened to hold key blank 42 in place. A first matrix key associated with the first notch of a first key to be duplicated is identified and cylindrical holder member 68 is pulled against the urging of spring 64 and rotated as necessary to establish coplanar and alignment of a first matrix key with the key blank. A first notch is cut in the key blank by operation of tool 6, rotation of cutting element 16, and urging a region of the first matrix key corresponding to the first code position against stylus 32. Once the first code position is cut on key blank 42, the holder element 68 is repositioned to align a second matrix key associated with a second notch of the first key to be duplicated, the second notch being in the second key code position along the working edge of the key blank. The tool 6 is again operated to cut this second notch in the key blank. This process is repeated until all key code positions have been cut.

Since the spacing and depth of matrix key notches differ from one lock manufacturer to another, the present invention contemplates the replacement of one cylindrical holder for another to accommodate these differences. With particular reference to FIGS. 2 and 4A, it will be appreciated that this can be easily achieved by removing thumbscrew 66 from threaded engagement with bore 43. This results in spring 64 and cylindrical holder 68 being removed at the same time. A separate cylindrical holder 68 containing the matrix keys for the next lock configuration is then aligned with carriage 40 so that spring 64 and bolt 66 can be reinstalled, setting up system 10 for the next operation.

With final reference to FIG. 2 it will be seen that a transparent shield indicated generally at 80 may be optionally secured to base 20 in order to deflect any material removed from key blank 42 by rotary cutter 16. To this end, holes 82 and 84 defined in shield 80 are dimensioned and arranged for alignment with corresponding holes 90 and 31 defined in base 20. Thumbscrews 86 and 88 permit rapid installation and/or removal of shield 80. Of course, it is expected that safety goggles or comparable eye protection will additionally be worn during operation of system 10.

It is believed that other modifications, variations and changes will be suggested to those skilled in the art in view of the teachings set forth herein. It is therefore to be understood that all such variations, modifications and changes are believed to fall within the scope of the present invention. Although specific terms are employed herein, they are used in their ordinary and accustomed manner only, unless expressly defined differently herein, and not for purposes of limitation.

What is claimed is:

1. A system for reproducing coded keys based on reference to notch spacing and depth of a plurality of matrix keys, each respective matrix key of a set having a common notch spacing and a notch depth representative of a correspondingly different code digit specified by a lock manufacturer, the system comprising:

a base;

a rotary cutter and a stylus respectively coupled to the base;

a carriage having a clamping vise secured thereto, the vise being positionable by the carriage in two directions relative to the rotary cutter and stylus so as to bring a working surface of a key blank held by the vise into engagement with the rotary cutter; and a holder carrying a plurality of matrix keys in fixed registration relative to one another, the holder being securable to the carriage for synchronized movement therewith and further being manipulable to position any selected one of the matrix keys in fixed alignment with a key Hank held by the vise without a need to remove from the holder any matrix key already retained, whereby movement of the carriage so as to urge a first respective notch location, of a first selected matrix key aligned in a common plane with the key blank, toward registration with the stylus causes the rotary cutter to remove material from the key blank to form a first corresponding notch location thereon, and whereby movement of the carriage so as to urge a second respective notch location, of a second selected matrix key aligned in a common plane with the key blank, toward registration with the stylus causes the rotary cutter to remove material from the key blank to form a second corresponding notch location thereon.

2. The system of claim 1, wherein the rotary cutter defines an abrasive cutting surface.

3. The system of claim 2, further including a motor adapted to drive the rotary cutter at a speed of at least 30,000 rpm.

4. The system of claim 1, wherein the carriage is movable angularly and linearly relative to the rotary cutter and stylus, respectively.

5. The system of claim 1, wherein the holder comprises an annular turret defining a plurality of peripheral slots each dimensioned and arranged to receive and retain a corresponding one of the matrix keys in a fixed position for selective coplanar alignment with a key blank, the holder being manipulable for rotation about an axis relative to the carriage so as to thereby bring about said selective coplanar alignment between any one of the matrix keys and the key blank.

6. The system of claim 5, further including a biasing spring for urging the holder against the carriage so as to enable synchronized movement of the holder and carriage.

7. The system of claim 6, further including a detent formed on the carriage and engageable with one of a plurality of holes defined in the holder, whereby each hole corresponds to a position of coplanar alignment between a key blank held by the vise and a selected one of the matrix keys carried by the holder.

8. The system of claim 5, wherein each matrix key is adhesively bonded to the angular turret.

9. The system of claim 5, wherein the annular turret further includes a clamping vise for receiving an original key to be duplicated if one is available.

10. The system of claim 1, further including a transparent shield securable to the base for deflecting material removed from a key blank working edge by the rotary cutter.

11. The system of claim 1, wherein the rotary cutter is secured to a rotary tool having a dielectric housing, a single operating speed, and a shaft extending at least 3 cm from the dielectric housing.

12. The system of claim 1, wherein the stylus comprises an annular disc having a slot extending from an axial bore to a peripheral edge to thereby permit adjustment of the stylus toward and away from a common reference point on a selected matrix key to thereby bring the selected matrix key into working alignment with the key blank.

13. The system of claim 1, wherein the holder is a first holder, the system further including a second holder carrying a second set of matrix keys associated with a different lock manufacturer than the matrix keys of the first set, wherein replacement of the first holder with the second holder enables code keys of a different code specification to be reproduced by indexing of the carriage and holder to bring a retained key blank against the rotary cutter.

14. For use in a key duplicating system having a base, a rotary cutter and stylus respectively coupled to the base, and a carriage having a clamping vise secured thereto, the vise being positionable by the carriage in two different directions relative to the rotary cutter and stylus so as to bring a working surface of a key blank held by the vise into engagement with the rotary cutter, a device for adapting the system to machine keys from a code when an original key is not available, the device comprising:
 a holder carrying a plurality of matrix keys in fixed registration relative to one another, the holder being securable to the carriage for synchronized movement therewith and further being manipulable to position any selected one of the matrix keys in fixed alignment with a key blank held by the vise without a need to remove from the holder any matrix key already retained,
 wherein each respective matrix key held by the holder has a common notch spacing and a notch depth representative of a correspondingly different code digit specified by a lock manufacturer
 whereby movement of the carriage so as to urge a first respective notch location, of a first selected matrix key aligned in a common plane with a key blank, toward registration with the stylus causes the rotary cutter to remove material from the key blank to form a first corresponding notch location thereon, and
 whereby movement of the carriage so as to urge a second respective notch location, of a second selected matrix key aligned in a common plane with the key blank, toward registration with the stylus causes the rotary cutter to remove material from the key blank to form a second corresponding notch location thereon.

15. The system of claim 14, wherein the holder comprises an annular turret defining a plurality of peripheral slots each dimensioned and arranged to receive and retain a corresponding one of the matrix keys in a fixed position for selective coplanar alignment with a key blank, the holder being manipulable for rotation about an axis relative to the carriage so as to thereby bring about said selective coplanar alignment between any one of the matrix keys and the key blank.

16. The system of claim 15, further including a biasing spring for urging the holder against the carriage so as to enable synchronized movement of the holder and carriage.

17. The system of claim 16, wherein the holder defines a plurality of holes respectively engageable with a detent formed on the carriage, whereby each hole location on the holder corresponds to a position of coplanar alignment between a key blank held by the vise and a selected one of the matrix keys carried by the holder.

18. The system of claim 15, wherein each matrix key is adhesively bonded to the angular turret.

19. The system of claim 15, wherein the annular turret further includes a second clamping vise for receiving an original key to be duplicated if one is available.

20. A system for reproducing coded keys based on reference to notch spacing and depth of a plurality of matrix keys, each respective matrix key of a set having a common notch spacing and a notch depth representative of a correspondingly different code digit specified by a lock manufacturer, the system comprising:
 a base;
 a rotary cutter coupled to the base,
 a rotary tool for driving the cutter, the rotary tool including an elongated dielectric housing, an on-off switch, and a shaft extending at least 3 cm from the housing for driving the cutter,
 a stylus coupled to the base;
 a carriage having a clamping vise secured thereto, the vise being positionable by the carriage in two orthogonal directions relative to the rotary cutter and stylus no as to bring a working surface of a key blank held by the vise into engagement with the rotary cutter; and
 a holder carrying a plurality of matrix keys in fixed registration relative to one another, the holder being securable to the carriage for synchronized movement therewith and further being manipulable to position any selected one of the matrix keys in fixed alignment with a key blank held by the vise without a need to remove from the holder any matrix key already retained,
 whereby movement of the carriage so as to urge a first respective notch location, of a first selected matrix key aligned in a common plane with the key blank, toward registration with the stylus causes the rotary cutter to remove material from the key blank to form a first corresponding notch location thereon, and
 whereby movement of the carriage so as to urge a second respective notch location, of a second selected matrix key aligned in a common plane with the key blank, toward registration with the stylus causes the rotary cutter to remove material from the key blank to form a second corresponding notch location thereon.

* * * * *